Jan. 10, 1950 A. G. MANKE 2,494,345

MULTIFREQUENCY OSCILLATION GENERATING SYSTEM

Filed June 26, 1946 3 Sheets-Sheet 1

Inventor:
Arthur G. Manke,
by Merton D. Moore
His Attorney.

Jan. 10, 1950 A. G. MANKE 2,494,345

MULTIFREQUENCY OSCILLATION GENERATING SYSTEM

Filed June 26, 1946 3 Sheets-Sheet 2

Inventor:
Arthur G. Manke,
by Merton D. Moore
His Attorney.

Inventor:
Arthur G. Manke,
by Merton D. Moore
His Attorney.

Patented Jan. 10, 1950

2,494,345

UNITED STATES PATENT OFFICE 2,494,345

MULTIFREQUENCY OSCILLATION GENERATING SYSTEM

Arthur G. Manke, Syracuse, N. Y., assignor to General Electric Company, a corporation of New York Application June 26, 1946, Serial No. 679,348

2 Claims. (Cl. 250—36)

This invention relates to oscillation generators and more particularly to generators capable of producing oscillations having any one of a plurality of pre-established frequencies.

It is an object of this invention to provide an improved oscillation generator capable of producing oscillations of any one of a plurality of frequencies distributed over a predetermined frequency range.

It is a further object of this invention to provide an oscillation generator having a simple control mechanism permitting choice of any one of a plurality of operating frequencies.

Yet another object of this invention is to provide an oscillation generator capable of producing a large number of different frequencies spaced over a predetermined frequency band and yet requiring only a small number of frequency establishing elements.

Still another object of this invention is to provide an oscillation generator capable of producing oscillations having any one of a plurality of pre-selected frequencies and at the same time having a negligible amount of other frequency components and a high degree of frequency stability.

In addition it is an object of this invention to provide an oscillation generator which may be adjusted to produce oscillations having any one of a large number of frequencies and yet requires only a small number of resonant circuit elements such as inductances, condensers, and the like.

Figure 1:
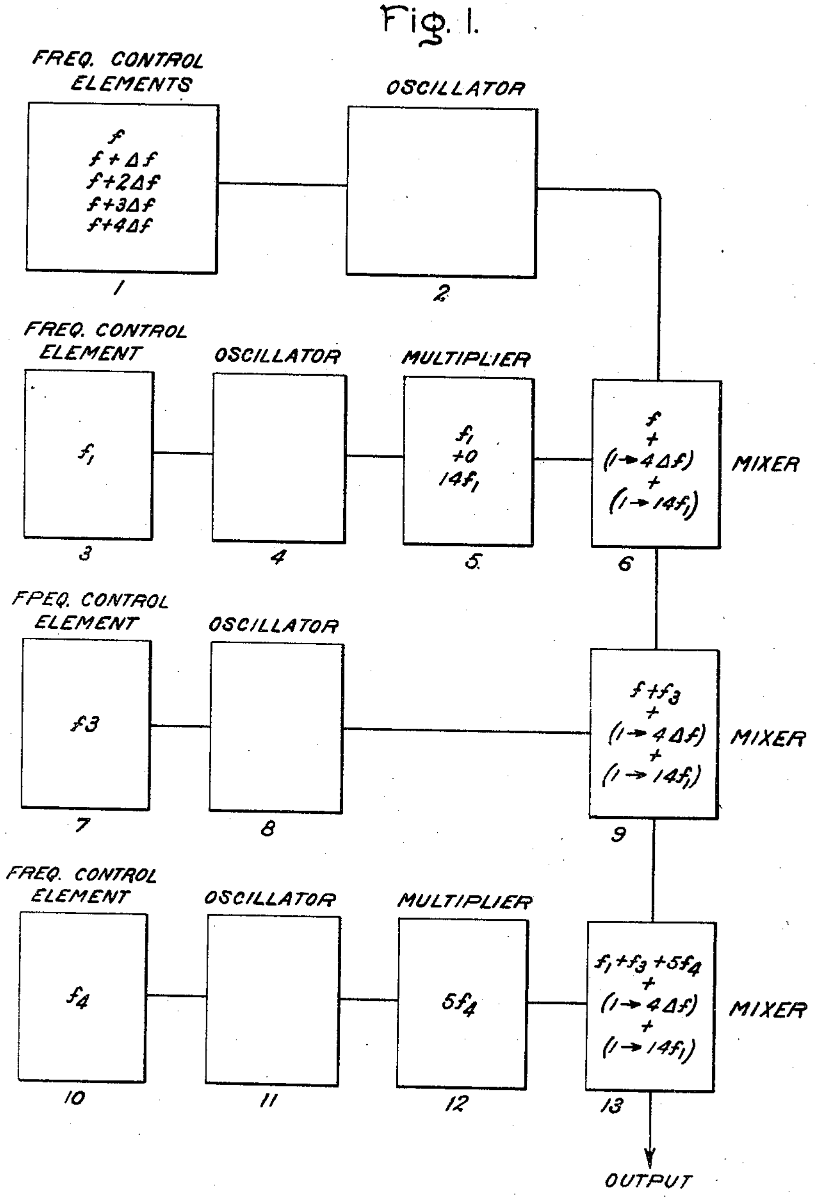
Figure 2:
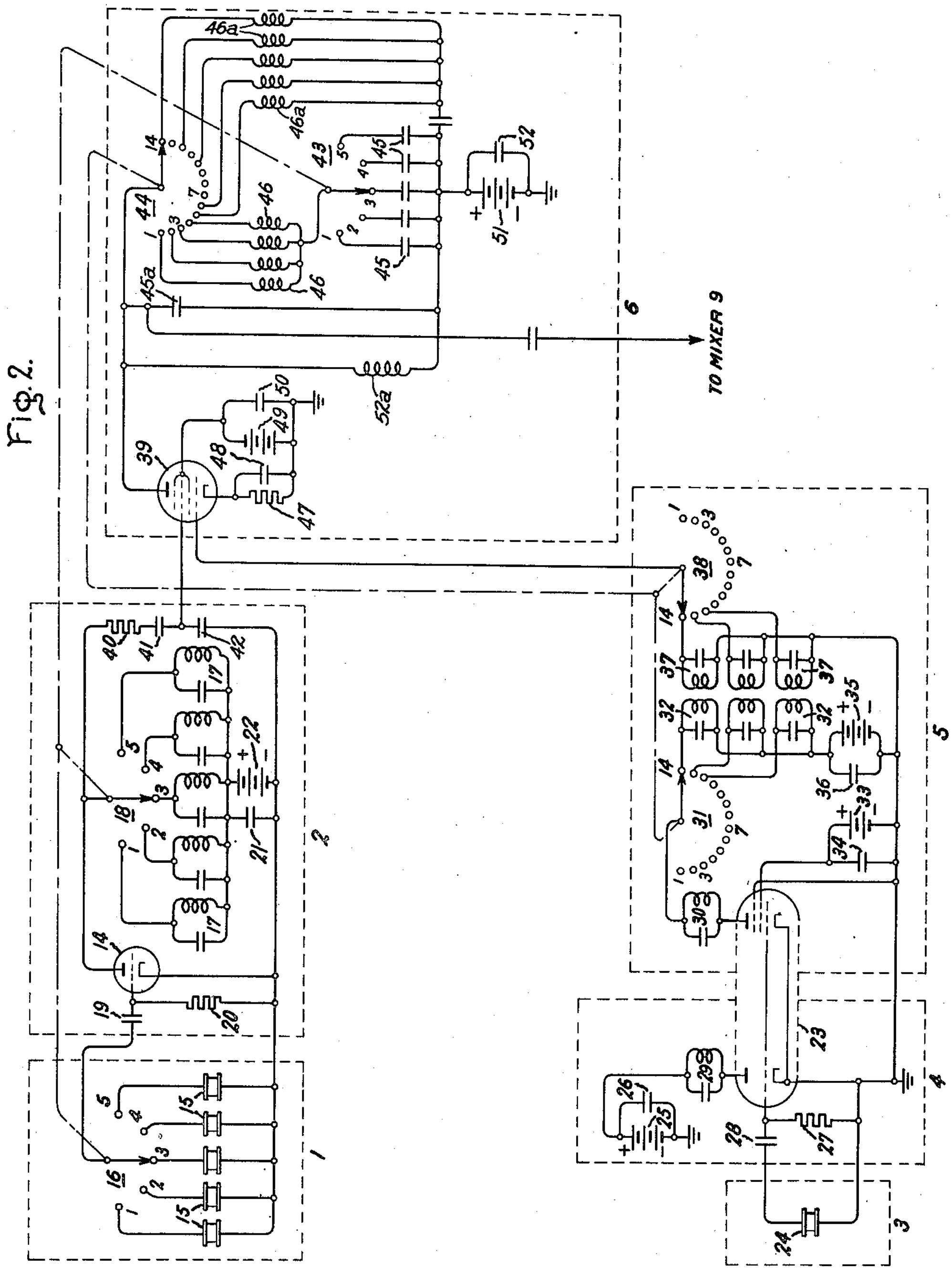
Figure 3:
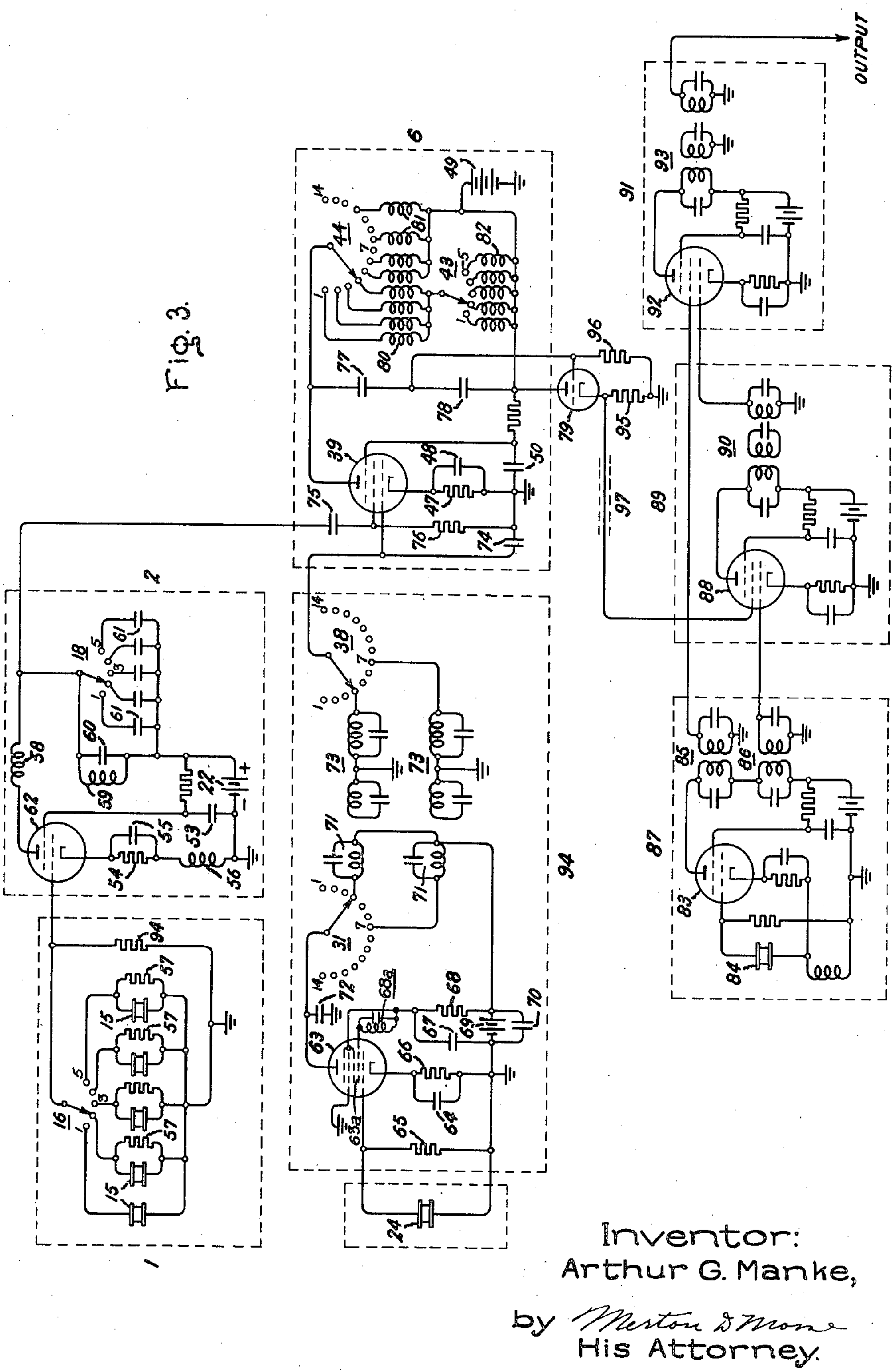

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawings in which Fig. 1 represents in block form the basic elements of a system embodying my invention: Fig. 2 shows a more detailed diagram of a portion of the circuits used in this embodiment of my invention and Fig. 3 shows an alternate embodiment thereof.

Referring to Fig. 1, I have shown at 1 a group of frequency control elements, such as high Q resonant circuits or piezo-electric crystals. The natural frequency of oscillation of each of these elements is equal to a base frequency, designated for purposes of reference as frequency $f$, plus an integral multiple of the frequency interval between the oscillations desired to be produced, herein designated as $\Delta f$. Any one of these frequency determining elements may be connected to oscillator 2 to produce oscillations having a corresponding frequency value. Hence the output frequency of oscillator 2 may be selected as $f$, $f+\Delta f$, $f+2\Delta f$, $f+3\Delta f$, and so on, depending on the total number of frequency control elements used.

A further frequency control element is shown at 3, Fig. 1. The frequency of this element is equal to $n\Delta f$, where $n$ is the number of elements in unit 1, thus providing oscillations of the frequency equal to the frequency difference next in progression after the last element of unit 1. In one embodiment of this invention designed to produce frequencies from 116,100 kc. to 129,900 kc. in 200 kc. steps, the frequency control elements at 1 permit oscillator 2 to operate at 3100 kc., 3300 kc., 3500 kc., 3700 kc., and 3900 kc., and the frequency determining element 3 is chosen to have natural frequency of $5\times200$ kc. or 1000 kc. Oscillator 4 produces oscillations of frequency determined by element 3, these oscillations being converted to a multiple of this frequency by multiplier 5. In the above-mentioned embodiment of this invention, for instance, these multiples are adjustable from 1 to 14, thereby providing at the output of multiplier 5 frequencies of 1000 kc., 2000 kc., 3000 kc., 4000 kc., etc., up to 14,000 kc.

Oscillations from oscillator 2 and multiplier 5 are applied to mixer 6. This unit produces beat oscillations having output frequencies equal to the sum of these two frequencies and the difference between these two frequencies. The difference frequencies are suppressed and the sum frequencies accentuated by tuned circuits in mixer 6, these circuits being tuned in accordance with the selected frequencies from oscillator 2 and multiplier 5 in a manner described in detail hereafter.

Inasmuch as the output of mixer 6 is of frequency corresponding to the sum of the frequency of oscillator 2 and multiplier 5, a large number of frequency values may be chosen by appropriate choice of operating frequency of these units. For each value of frequency from multiplier 5, there exist a number of values of frequency of oscillator 2, this number being equal to the number of frequency determining elements in unit 1 and each frequency being spaced from the adjacent frequencies by frequency $\Delta f$. Hence, in the above-described embodiment of this invention, with multiplier 5 set to produce oscillations having frequency of 1000 kc., mixer 6 will produce output frequencies of 4100 kc., 4300 kc., 4500 kc., 4700 kc., and 4900 kc., as the frequency of oscillator 2 is varied over the available frequency range. With multiplier 5 set to produce oscillations having frequency of 2000 kc., mixer 6 produces frequencies of 5100 kc., 5300 kc., 5500 kc., 5700 kc., and 5900 kc., in accordance with the setting of oscillator 1. Similar frequencies may be produced from other settings of multiplier 5, the maximum frequency being 17,900 kc. corresponding to the maximum frequencies of multiplier 5 and oscillator 2. Hence, oscillations varying in frequency from 4100 kc. to 17,900 kc. in 200 kc. steps may be obtained from mixer 6.

Oscillator 8, having frequency $f_3$ determined by frequency control element 7 is provided to increase the frequency values between which the choice of frequency from mixer 6 is obtained. Oscillations from this oscillator and from mixer 6 are applied to mixer 9 which produces sum and difference frequency components in the same manner as mixer 6. The frequency of oscillator 8 is chosen of value to cause the difference frequency components to be very low in frequency as compared to the lowest frequency from mixer 9, thereby permitting use of a simple filter in mixer 9 to eliminate these frequencies and accentuate the desired sum frequencies. In the case of the above-described embodiment of my invention, for instance, the frequency of oscillations from mixer 6 varies from 4100 kc. to 17,900 kc. whereas frequency $f_3$ is 20,000 kc. The maximum difference frequency then is 15,900 kc. and the minimum value of sum frequency 24,100 kc., a value that permits easy separation of the difference frequency components by a tuned circuit in mixer 9.

The frequency of oscillations from mixer 9 is raised to the final desired value by means of oscillator 11 having a single frequency control element 10, multiplier 12, and mixer 13. The output frequency of multiplier 12 is of such frequency that with the minimum frequency from mixer 9, oscillations are produced of frequency corresponding to the lowest desired output frequency. Because of the relatively large minimum frequency from mixer 9, it is possible to avoid difference frequencies in the output of mixer 13 by using a suitably tuned output circuit. In the embodiment of this invention described above, multiplier 12 produces output frequency of 92,000 kc. so that the minimum sum frequency output from mixer 10 is 116,100 kc. and the maximum sum frequency output from mixer 10 is 129,900 kc. Since the corresponding difference frequencies are 67,900 kc., and 54,100 kc., it is evident that a resonant circuit in mixer 10 may be set to pass this range of sum frequencies and to suppress the difference frequencies to a negligible value.

The above described embodiment of this invention is intended for use as part of a calibrated superheterodyne receiver having a 8000 kc. intermediate frequency and tuning from 108.1 mc. to 121.9 megacycles in 200 kilocycle steps. In this system, mixer 6, multiplier 5, and oscillator 2, are tuned simultaneously in a manner described in detail hereafter. Mixer 9, mixer 13, and the radio frequency amplifiers of the receiver are likewise tuned simultaneously, mixer 9 and mixer 13 being located near the radio frequency amplifiers. Inasmuch as the tuning of mixers 9 and 13 and the radio frequency amplifiers of the receiver need only be relatively rough, this tuning needs only to be adjusted to an approximate degree as signals of different frequencies are received and the principal frequency selection is that associated with tuning oscillator 2, multiplier 5, and mixer 6 by the separate control provided for that purpose.

Having described generally the basic components of a source of oscillations embodying the principles of this invention, a more detailed description of the portion of the circuits including units 1, 2, 3, 4, 5, and 6 will now be made with reference to Fig. 2. In that figure, oscillator 2 is of the conventional type using triode electron discharge device 14. The control electrode of this device is arranged to be connected to any one of piezo-electric crystals 15 by switch 16. The anode of device 14 may likewise be connected to any one of resonant circuits 17 by selector switch 18, the resonant frequency of each of these circuits corresponding to that required for best operation of the corresponding crystal 15. By simultaneously rotating switches 16 and 18, oscillator 2 may be adjusted to produce oscillations of frequency determined by any one of crystals 15. Grid bias for device 14 is provided by capacitor 19 and resistance 20 and space path voltage from capacitor 21 and unidirectional voltage source 22.

Oscillator 4 is of conventional construction utilizing the triode section of electron discharge device 23 and frequency determining piezoelectric crystal 24. Space path potential for this section of device 23 is derived from unidirectional voltage source 25 and capacitor 26. Resistance 27 and capacitor 28 provide grid bias for device 23. Tuned circuit 29 is adjusted for best performance of crystal 24, the resonant frequency of this circuit being very nearly equal to the resonant frequency of crystal 24.

Multiplier 5 utilizes the pentode section of electron discharge device 23, receiving control electrode voltage from connection with the control electrode of the triode section of that device. Resonant circuit 30 in the anode circuit of this section of device 23 is tuned to the frequency of crystal 24 thereby to limit voltage of this frequency in the output of multiplier 5. Selector switch 31 permits choice of any one of resonant circuits 32. Each resonant circuit 32 corresponds in resonant frequency to a harmonic of crystal 24 between the first and the fourteenth, the harmonics increasing progressively as switch 31 is changed from position 1 to position 14. When switch 31 is in position 1, the resonant circuit 32 is tuned to the frequency of crystal 24. In this case the fundamental frequency voltage in the multiplier divides between resonant circuits 30 and 32, the latter being designed to have voltage comparable in magnitude to that obtained with switch 31 set to produce higher harmonics. At all other settings of switch 31, resonant circuit 30 merely filters out the fundamental frequency voltage in the corresponding resonant circuit 32. Screen grid potential for the pentode section of device 23 is derived from unidirectional voltage source 33 and condenser 34 whereas anode potential is derived from unidirectional voltage source 35 and condenser 36.

Each portion of resonant circuit 32 is coupled to a correspondingly tuned portion of resonant circuit 37 so that selection of the proper circuit by selector switch 38 permits the control electrode of mixer electron discharge device 39 to receive oscillations of the desired frequency from multiplier 5. Oscillations from oscillator 2 are fed to the injector electrode of device 39 through resistor 40 and capacitors 41 and 42, thus causing the space current of that device to vary in accordance with oscillations from both oscillator 2 and multiplier 5.

Switches 43 and 44 are arranged to permit tuning of the anode circuit of device 39 to approximate resonance with the desired sum or difference frequency between oscillations from unit 2 and unit 5. To this end, switch 44 permits choice of any one of inductances 46 or 46*a* while switch 43 permits choice of any one capacitor 45 in series with the chosen inductance 46. As will be described in further detail hereafter, the values of these inductances and capacitances are so chosen that rotation of switch 43 causes a resonant frequency change corresponding to the frequency change associated with choice of successive crystals 15 by switch 16 and rotation of switch 44 causes a resonant frequency change corresponding to that associated with choice of successive harmonics of crystal 24 by switches 31 and 38. Control electrode bias voltage for device 39 is obtained from resistance 47 and capacitor 48; screen electrode voltage is obtained from unidirectional voltage source 49 and capacitor 50; and anode voltage from unidirectional voltage source 51, capacitor 52 and radio frequency choke coil 52*a*.

The resonant circuit in the anode circuit of device 39 may be viewed as consisting of capacitor 45*a* having in parallel any one of a plurality of separate inductance-capacity combinations. At the relatively high frequencies corresponding to positions 5 to 14 of switches 31 and 38, the proportional frequency change associated with operation of switches 16 and 18 is not sufficiently great to affect the output of mixer 6. In this region it is therefore unnecessary to change the effective inductance in parallel with capacitor 45*a* as the various crystals 15 are selected. Hence, switches 16 and 18 may be placed in position 3 and inductances 46*a* adjusted for best resonance with capacitance 45*a* and substantial resonance will then exist at other positions of switches 16 and 18.

When switches 31 and 38 are in positions 1 to 4, the desired output frequency of mixer 6 is so low that choice of successive crystals 15 causes a substantial percentage frequency change and a correspondingly large detuning error and variation in output voltage unless the anode circuits of device 39 are correspondingly tuned. Within this region, capacitors 45 are successively switched in the circuit as the position of switch 43 is changed. With switches 16, 18, and 43 in position 3 and a reasonable value of capacitor 45, the successive values of inductance 46 may then be chosen to cause resonance as switches 31, 38, and 44 are changed. Then with switches 31, 38, and 44 in position 2 or position 3, the values of condensers 45 at positions 1, 2, 4, and 5 of switch 43 may be adjusted to cause resonance at the desired frequency of output from mixer 6. With these adjustments, other combinations of positions of switches 43 and 44 will be found to produce substantial resonance in the circuit of device 39 and hence cause the desired output voltage to be applied to mixer 9.

If the frequency range over which the resonant circuit of device 39 is to be adjusted is very great, it is further necessary to cause condensers 45 to be effective only in the low frequency end of the scale for the reason that the resonant frequency change associated with the change in capacitance between successive positions of switch 43 may be to an undesired harmonic applied to device 39. In the above-described embodiment of this invention, for example, successive harmonics of crystal 24 are only 1000 kc. apart and, despite the filtering action of the circuits 32 and 37, the oscillations actually applied to device 39 contain a substantial proportion of harmonics adjacent to the harmonic for which these circuits are tuned. With condensers 45 chosen for reasonably accurate tuning in the low frequency range, the values thereof may readily cause a difference of 1000 kc. from position 3 of switch 43 and position 1 or 5 when a high harmonic of crystal 24 is chosen by switches 31 and 38. The circuit of Fig. 2 avoids this possibility by causing switch 43 to be effective only in the low frequency range of the system.

It will be obvious to those skilled in the art that the switches 16, 18, and 43 may be mounted on a common shaft so that rotation of that shaft alters their positions simultaneously. Similarly, switches 31, 38, and 44 may be arranged for simultaneous operation by mounting them on a common shaft. If, in addition, the two shafts are mechanically arranged so that each rotation of switches 16, 18, and 43 over the five possible positions causes switches 31, 38 and 44 to move one position, rotation of the single shaft associated with switches 16, 18, and 43 then causes the frequency of oscillations from mixer 6 to increase in 200 kc. steps from one end of the desired frequency range to the other.

A further feature of the embodiment of this invention shown in Fig. 1 resides in choice of the frequency of control element 7 and oscillator 8, Fig. 1, to provide a maximum suppression of difference frequencies in the oscillations from mixer 9. While in the specific embodiment of this invention described in detail herein, satisfactory operation was achieved by the use of frequency $f_3$ of almost twice the middle frequency available from mixer 6, the teachings of this invention contemplate the choice of a frequency more nearly this middle frequency when it is desired to further attenuate the difference frequencies from mixer 9 as compared with the sum frequencies.

Fig. 3 shows an embodiment of this invention incorporating a number of modifications not shown in Figs. 1 and 2. In this embodiment, the circuit used with crystals 15 and electron discharge device 62 is the "Tri-tet" circuit in which electron discharge device 62 is a tetrode with the screen grid held at ground radio frequency potential by means of by-pass capacitor 53. This circuit has the advantage of producing additional isolation between the output circuits of oscillator 2 and the crystal frequency determining elements 15. The cathode of device 62 is connected to ground through bias resistance 54 and capacitance 55 and tuned circuit 56. The latter circuit comprises coil 56 which is tuned by its own distributed capacitance to resonate at a frequency corresponding to one of crystals 15 and is in a near-resonate condition at the frequencies of the other crystals. Resistances 57 are placed in parallel with the crystals 15 at which coil 56 provides most nearly the correct resonant frequency, the values of these resistances varying in accordance with the variations in output voltage associated with error between the resonant frequency of coil 56 and the crystal chosen. This provides substantially constant voltage at the control electrode of device 62 for all positions of switch 16. Resistance 94 acts as a grid leak when switch 16 is in position 1.

In the anode circuit of device 62, coil 58 is provided to reduce the harmonic components of output voltage applied to mixer 6. This coil is adjusted to offer a large impedance to harmonics of crystals 15, thus to eliminate these harmonics in the voltage across coil 59. Selector switch 18 is arranged to select any one of condensers 61, these condensers adding to the capacity of condenser 60 to cause resonance with coil 59 at each of the oscillating frequencies of crystals 15.

Electron discharge device 63 acts as an oscillator multiplier. In this circuit, resistance 65 provides overload protection for crystal 24 and bias for the control electrode of device 63, resistance 66 and capacitor 64 provide control electrode bias, unidirectional voltage source 69 and capacitor 70 provide anode-cathode voltage, and resistance 68, condenser 67 and source 69 provide screen grid voltage. Resonant circuit 68*a* is tuned to approximately the fundamental frequency of crystal 24 to cause oscillations of crystal 24 with the triode portion of device 63 (the cathode, the control electrode, and auxiliary electrode 63*a*). The output circuit of device 63 is tuned to a particular harmonic of crystal 24 by means of switch 31, the value of this harmonic being determined by the resonant frequency of the coil-condenser combination 71 selected by switch 31 and the capacity of condenser 72. The values of these components are arranged to cause successive positions of switch 31 to produce signals of frequency varying from the fundamental frequency of crystal 24 to the fourteenth harmonic thereof.

If it is desired to provide a degree of isolation between the crystal 24 and the output circuits of device 63, the "tri-tet" circuit used in connection with device 62 can, of course, be used.

Switch 38 selects one element of resonant circuits 73 for connection to the control electrode of mixer device 39. The operation of this portion of the system is identical with the corresponding elements in Fig. 2 except that a doubly tuned system incorporating two tuned circuits is employed in elements 73. This provides additional selective action for signals applied to the control electrode of device 39 and thereby further suppresses undesired harmonic components of the output voltage from oscillator-multiplier 94. Condenser 74 provides a constant value of capacitance in one portion of the resonant circuits 73, thereby reducing the size of the required capacitor and inductor in each separate unit.

Signals from oscillator 2 are applied to the injection grid of mixer electron discharge device 39 by means of condenser 75 and resistance 76. Output signals from device 39 are applied through the voltage divider comprising condensers 77 and 78 and resistance 96 to the control electrode of electron discharge device 79. The tuning system of mixer 6 shown in Fig. 3 accomplishes the same performance as that shown in Fig. 2 but in a somewhat different fashion. In Fig. 3 inductances are used to establish both the large frequency changes associated with operation of switches 31, 38, and 44 and the smaller frequency changes associated with operation of switches 16, 18, and 43. The design of the system is essentially the same, however. With switches 16, 18, and 43 in mid-position, inductances 80 and 81 are adjusted to cause exact correspondence between the resonant frequency of the circuit including capacitors 77 and 78, and the distributed capacity of inductances 80 and 81 and the frequency corresponding to the sum of the frequencies of oscillations from oscillator 2 and multiplier 64. With switches 31, 38, and 44 in position 2, for example, coils 82 are then adjusted to provide exact correspondence in these frequencies as switches 16, 18, and 43 are rotated.

In the circuit shown in Fig. 3, only coils 80, connected to the first four positions of switch 44, are connected to coils 82. At the operating frequencies corresponding to the other positions of switches 31, 38, and 44, it is unnecessary to provide additional change in inductance as switches 16, 18, and 43 are rotated as satisfactory rejection of unwanted frequencies can be achieved without such change.

It will of course be obvious that unicontrol mechanism may also be incorporated in the system of Fig. 3 for actuating the various switches 16, 18, 43 and 31, 38, 44 in the same manner as is indicated schematically in Fig. 2.

The function of cathode follower electron discharge device 79 is to provide a suitable output impedance for connection to coaxial cable 97 and to isolate mixer 6 from other components in the system. Use of this device facilitates location of the above-described units in a remote location as compared with the other units in the system and the main radio receiver. This device develops voltage across resistance 95 which varies in accordance with the oscillations in mixer 6 and is applied to transmission line 97.

Oscillator 87 includes crystal 84 and electron discharge device 83 in the "Tri-tet" circuit described in connection with oscillator 2. Two output circuits are provided for this oscillator, each of these having a tuned secondary circuit to provide maximum rejection of undesired frequency components. One of these circuits, 86, is tuned to the fundamental frequency of crystal 84 whereas the other circuit, 85, is tuned to the fifth harmonic of that frequency. Hence with crystal 84 having a natural operating frequency of 18,666.66 kc., oscillations of 18,666.66 kc. are produced across circuit 86 and 93,333.33 kc. across circuit 85.

Mixer 89, using electron discharge device 88 having its control electrode connected to circuit 86 and its injection electrode connected to device 79, produces output voltage equal to the sum of the frequencies applied to these electrodes. Since the frequency from circuit 86 is 18,666.66 kc. and the oscillations from device 79 vary from 4100 kc. to 17,900 kc., the sum frequency component of oscillations from mixer device 88 vary from 22,766 kc. to 36,566 kc. The difference frequency component varies from 766 kc. to 16,166 kc. Inasmuch as these frequency values are widely separated it is unnecessary to provide a sharply tuned circuit to reject the difference frequency and the broadly tuned circuit 90 may be utilized. Broad tuning of circuit 90 is achieved by tuning the three separate sections to three resonant frequencies near the range of 22,766 kc. to 36,566 kc. as, for example, 22,000 kc., 29,500 kc., and 37,000 kc. This provides a nearly uniform output voltage in mixer 89 over the desired frequency range without the need for a tuning system which must be adjusted as switches 16, 18, and 43 or 31, 38, and 44 are changed.

Mixer 91 utilizes mixer electron discharge device 92 having its control electrode connected to mixer 89 and its injection electrode connected to resonant circuit 85. Inasmuch as the frequency of oscillations at resonant circuit 85 is 93,333 kc., and the frequency of oscillations from mixer 89 varies from 22,766 kc. to 36,566 kc., the sum component of frequency of oscillations in device 92 varies from 116,100 kc. to 129,900 kc. These frequencies produce the desired 8000 kc. to intermediate frequency signals when beating with applied signals varying from 108,100 kc. to 121,900 kc. Inasmuch as the difference frequencies in mixer 92 vary from 70,567 kc. to 56,767 kc., an adequate degree of rejection of these frequencies can be achieved by utilizing broadly tuned circuit 93 in mixer 91. This circuit includes three tuned circuits and is constructed in a manner similar to circuit 90 to provide a nearly uniform output voltage over the frequency range of output signals from mixer 91.

While I have shown and described particular embodiments of my invention, it will be obvious to those skilled in the art that changes and modifications may be made without departing from my invention in its broader aspects and I therefore aim in the appended claims to cover all such changes and modifications as fall within the true spirit and scope of my invention.

What I claim as new and desire to secure by Letters Patent of the United States is:

1. A multi-frequency oscillation generating system comprising, in combination, a first oscillation source selectively operable to produce one of a plurality of relatively low fixed output frequencies, a second oscillation source selectively operable to produce one of a second plurality of fixed output frequencies higher than frequencies from said first source, a mixer supplied with oscillations from both said sources and including a tunable circuit for selecting a beat frequency, said circuit being conjointly tuned by two reactive tuning elements included respectively within first and second groups of selectable tuning elements, a first unicontrolled switching mechanism for simultaneously selecting a frequency from said first source and a particular element from said first group, and a second, independent, unicontrolled switching mechanism for simultaneously selecting a frequency from said second source and a particular element from said second group, said selected elements together tuning said circuit to select a desired beat frequency.

2. A multi-frequency oscillation generating system comprising, in combination, a first oscillation source selectively operable to produce one of $n$ fixed output frequencies equally spaced from each other by a frequency difference $\Delta f$, a second oscillation source selectively operable to produce one of a number of fixed frequencies each equal to an integral multiple of $n\Delta f$, a mixer supplied with oscillations from both said sources and including a tunable circuit for selecting the sum frequency, said circuit being conjointly tuned by two reactive tuning elements included respectively within first and second groups of selectable tuning elements, a first unicontrolled switching mechanism for selecting a particular frequency from said first source and simultaneously selecting an element from said first group, and a second, independent, unicontrolled switching mechanism for selecting a particular frequency from said second source and simultaneously selecting an element from said second group, said selected elements together tuning said circuit to select a desired sum frequency.

ARTHUR G. MANKE.

REFERENCES CITED

The following references are of record in the file of this patent:

UNITED STATES PATENTS

| Number | Name | Date |
|---|---|---|
| 2,131,558 | Granger | Sept. 27, 1938 |
| 2,248,442 | Stocker | July 8, 1941 |
| 2,265,083 | Peterson | Dec. 2, 1941 |